United States Patent
Srinivasan et al.

(10) Patent No.: US 8,255,146 B2
(45) Date of Patent: Aug. 28, 2012

(54) TIME SLOT BASED ROADWAY TRAFFIC MANAGEMENT SYSTEM

(76) Inventors: Sudharshan Srinivasan, Fremont, CA (US); Jai Kumar, Cupertino, CA (US); Kothandraman Ramchandran, Fremont, CA (US)

( * ) Notice: Subject to any disclaimer, the term of this patent is extended or adjusted under 35 U.S.C. 154(b) by 412 days.

(21) Appl. No.: 12/586,610

(22) Filed: Sep. 23, 2009

(65) Prior Publication Data

US 2011/0068952 A1 Mar. 24, 2011

(51) Int. Cl.
*G01R 27/28* (2006.01)
*G01R 31/00* (2006.01)
*G01R 31/14* (2006.01)

(52) U.S. Cl. ........ 701/118; 340/988; 340/991; 340/993; 340/994; 340/995.18; 340/995.19; 701/117; 701/119; 701/424

(58) Field of Classification Search .................. 340/931, 340/932, 904–905, 934–935; 701/117–118, 701/400, 423–424; 705/7.12, 13, 14.1
See application file for complete search history.

(56) References Cited

U.S. PATENT DOCUMENTS

| | | | | |
|---|---|---|---|---|
| 4,360,875 A * | 11/1982 | Behnke | ........ | 455/456.5 |
| 5,475,597 A * | 12/1995 | Buck | ........ | 455/456.5 |
| 5,541,845 A * | 7/1996 | Klein | ........ | 701/446 |
| 6,317,686 B1 * | 11/2001 | Ran | ........ | 701/533 |
| 6,363,323 B1 * | 3/2002 | Jones | ........ | 701/468 |
| 6,411,891 B1 * | 6/2002 | Jones | ........ | 701/465 |
| 6,415,207 B1 * | 7/2002 | Jones | ........ | 701/1 |
| 6,480,783 B1 * | 11/2002 | Myr | ........ | 701/117 |
| 6,486,801 B1 * | 11/2002 | Jones | ........ | 340/994 |
| 6,611,755 B1 * | 8/2003 | Coffee et al. | ........ | 701/482 |
| 6,965,913 B2 * | 11/2005 | Levitan | ........ | 709/203 |
| 7,299,271 B2 * | 11/2007 | Sato | ........ | 709/219 |
| 7,508,321 B2 * | 3/2009 | Gueziec et al. | ........ | 340/905 |
| 7,522,995 B2 * | 4/2009 | Nortrup | ........ | 701/425 |
| 7,599,770 B2 * | 10/2009 | Hardy | ........ | 701/521 |
| 7,610,145 B2 * | 10/2009 | Kantarjiev et al. | ........ | 701/527 |
| 7,756,633 B2 * | 7/2010 | Huang et al. | ........ | 701/517 |
| 7,840,341 B1 * | 11/2010 | Sato et al. | ........ | 701/423 |
| 7,902,997 B2 * | 3/2011 | Stehle et al. | ........ | 340/905 |
| 8,069,203 B2 * | 11/2011 | Leiber | ........ | 709/203 |
| 2005/0021223 A1 * | 1/2005 | Heaps et al. | ........ | 701/200 |
| 2005/0088320 A1 * | 4/2005 | Kovach | ........ | 340/933 |
| 2006/0129313 A1 * | 6/2006 | Becker et al. | ........ | 701/202 |
| 2006/0135120 A1 * | 6/2006 | Likourezos | ........ | 455/406 |
| 2006/0155460 A1 * | 7/2006 | Raney | ........ | 701/207 |
| 2006/0282496 A1 * | 12/2006 | Leiber | ........ | 709/203 |
| 2007/0124043 A1 * | 5/2007 | Ayoub et al. | ........ | 701/36 |
| 2007/0225912 A1 * | 9/2007 | Grush | ........ | 701/213 |
| 2008/0119965 A1 * | 5/2008 | McCrary | ........ | 701/2 |
| 2009/0005963 A1 * | 1/2009 | Jarvinen | ........ | 701/201 |
| 2009/0024309 A1 * | 1/2009 | Crucs | ........ | 701/118 |
| 2009/0210302 A1 * | 8/2009 | Tashev et al. | ........ | 705/14 |
| 2009/0287408 A1 * | 11/2009 | Gerdes et al. | ........ | 701/202 |

* cited by examiner

*Primary Examiner* — Daniel Wu
*Assistant Examiner* — Son M Tang

(57) ABSTRACT

A traffic management system (31) is described that combines wireless tracking of motorists (32) with scheduling of time slots for travel on roadways (33) during peak hours. Rewards are given to motorists (32) who travel during allotted time slots thus improving the effectiveness of the system over time. Motorists are tracked using their cellular device to check if a reward can be given or not, based on travel undertaken in the allotted time slot.

10 Claims, 2 Drawing Sheets

TIME SLOT BASED TRAFFIC MANAGEMENT SYSTEM

TIME SLOT BASED ROADWAY TRAFFIC MANAGEMENT SYSTEM

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

The present invention generally relates to traffic management systems to manage automobile traffic in roadways and specifically to traffic management systems that use cellular phones and corresponding networks to track roadway traffic.

Traffic management systems are in existence today in many forms. Traffic management systems can be broadly classified into traffic monitoring systems, and traffic control systems.

Some systems allow monitoring of roadways using sensors or cameras and feed data about roadway traffic to a central server which then broadcasts the acquired data to motorists using broadcast methods such as radio signals. There are other systems that monitor roadway traffic using signals from cellular phones to generate a mapping of roadway traffic at any point in time. Such traffic monitoring systems generate a lot of data and timely dispatch of such data to motorists is essential for such systems to be valuable to motorists.

On the other hand traffic control systems provide a way to control traffic onto specific roadways to prevent traffic jams and overloads. Such systems constitute stop lights at intersections or freeway entrances to control the number of cars that can enter a roadway at any point in time.

There are also systems that combine the traffic monitoring system with traffic control systems in order to make traffic control more efficient.

All such systems that are in use today have not solved the traffic overloads we encounter almost every day. This is because controlling roadway entry is not sufficient to reduce traffic problems as motorists are unaware of traffic conditions in real time. Radio broadcasts happen once in ten minutes, and if a motorist has already entered into a roadway entry, there is no way to turn back.

For further discussion the term freeway will be used to illustrate a roadway with no signals or minimal signals.

Feeding back acquired traffic data into traffic control systems may make the entry signals more efficient, but it will not stop motorists from queuing up behind traffic entry points which will then lead to long wait times before a freeway can be entered. Also, there is no way to control freeway exit points since such exit points are usually connected to internal roadway signals and if more motorists want to take a particular exit than what can be supported by the internal roadway light signal, then that will result in a backup of traffic on the freeway which then leads to longer lines at entry points.

Hence we can see that traffic problems arise because there are more motorists that want to use a freeway at particular points in time than what can be supported by that freeway at a desired speed.

Also, linking up freeway entry lights and lights near exit with internal roadway lights and finding out the exact number of cars that can be allowed to enter a freeway is non scalable solution as every traffic light on all streets will have to be linked up and that will result in enormous capital expenditure.

The fundamental problem with existing solutions is that there is no predictability in travel routes of motorists at particular instances of time. Hence there is no way to effectively control traffic lights at freeway entries, or lights close to freeway exits. No amount of feedback into traffic control system will result in reduced traffic as such systems are easily overwhelmed with the large number of motorists.

Hence there is a need for a traffic management solution that does not suffer from above mentioned issues but and provides a solution that is not capital intensive, effective for all roadways, and offers efficient transport to motorists with predictable travel times.

Such a solution is not known to exist.

Currently there are no known prior art methods that offer a solution to above mentioned problems.

Following paragraphs in current section describe relevant prior arts in this field.

Prior art U.S. Pat. No. 6,577,946 proposes a system to acquire real time traffic data using cellular phones and feeding back acquired data into traffic control system. As mentioned above, this system has several limitations. First the amount of data generated by every cellular user who is a motorist will result in a very large database, which then results in large amounts of decision vectors to be exchanged with every entry and exit signal near a freeway. This is a non scalable and capital intensive solution given that all signals have to be networked and maintained forever. Even if such an investment has been made, this system will be overwhelmed when too many motorists wish to be at the freeway around the same time.

Prior art U.S. Pat. No. 6,973,319 proposes a similar system that addresses the data acquisition of traffic conditions using cellular phones and associated cellular networks. But this does not address the basic problem of how to prevent or control overload conditions of a freeway.

Prior art US Doc 20030014181 is a similar system that addresses the data acquisition of traffic conditions using cellular phones and associated cellular networks. But this does not address the basic problem of how to prevent or control overload conditions of a freeway.

As can be seen from above, all known prior arts suffer from some limitations in providing a traffic management solution that is not capital intensive, is scalable and effective in managing overload conditions in freeways or other roadways.

OBJECTS AND ADVANTAGES

Accordingly, several objects and advantages of the present invention are:
 a) to provide a traffic management system that prevents traffic problems from occurring;
 b) to provide a traffic management system that works for roadways that have entry or exit signals, and roadways that do not have them;
 c) to provide a traffic management system that does not need large capital investments; and
 d) to provide a traffic management system that is scalable.

SUMMARY

In accordance with present invention a traffic management system is provided that helps in preventing traffic overloads from occurring on roadways.

This is achieved by scheduling time slots for motorists to travel a desired roadway or a set of roadways based on requests of motorists, and rewarding them for honoring the scheduled slot by traveling in or approximately around the agreed upon time slot by one of several rewarding means.

The knowledge of whether a motorist has honored the system specified time slot for travel is determined by tracking a cellular device associated with the motorist in the automobile of travel. Data from location of the cellular device is also used to determine current traffic conditions so that this system can efficiently schedule motorists into roadways.

Such a system where motorists are scheduled for travel, will improve the traffic load at freeway entry and exit points since motorists do not have to queue up at freeway entries anymore. Motorists can depart from the initial point of travel only when their scheduled time slot is nearing hence not congesting the entry points.

Initially this system may have few users, and the improvements provided to overall traffic conditions may not be noticeable, but as more users participate in this system, traffic conditions will improve dramatically.

For example, any freeway that has traffic overload in peak times, and has motorists moving at half the legal speed limit, implies that there are twice the number of motorists than what can be supported by the freeway system at that point in time. If motorists were allowed to travel at full legal speed limit during the same peak travel times, then they would take up only half the time to reach the destination. So, if we schedule first half of motorists for the first half of travel time and second half of motorists for second half of travel time, the time to reach the destination is maintained for each motorist while reducing overall travel time and traffic conditions.

Such a system can realize full potential if half of users using this freeway in the example above sign up for time slot based travel. Even a small set of users, who honor the time slot based travel can improve traffic conditions incrementally.

Since motorists may not perceive an immediate value until a threshold number of motorists sign up for such a system, the system of present invention implements a reward system for each motorist who participates in this system. Each motorist that honors the scheduled travel times is rewarded with points that may be redeemed for future travel, grocery, gas purchases, and coupons to events or allowance to use high occupancy lanes. The rewards may be sponsored by advertisers or by government agencies.

Hence motorists will initially only see reward points for participating in this time slot based travel system and not see any reduction in travel times, but after a threshold number of motorists signup, such as ten percent, motorists will see the benefit of reduced travel time proportional to the number of motorists signing up for the system in addition to the rewards. If we consider the above example, for every ten percent of motorists signing up, the travel times will be reduced by twenty percent which is significant in a travel time of one hour. This benefit will be even better for freeways that have to support more than twice the supportable traffic in peak hours.

This system can be implemented by tracking cellular devices with no new infrastructure costs such as for networking traffic stop light signals, or installing new sensors on roadways or installing new transducers in automobiles to track a motorist or installing new cameras to police a motorist like other systems of prior art.

This system will work in countries where there are no standard freeway entry and exit signals, and there are no traffic lanes but have cellular towers tracking each motorist.

This system does not need policing since there are no laws that need to be broken. It is completely up to a motorist to participate in this system, although with increased environmental awareness, it is likely that most motorists will sign up as it costs them very little, provides them with rewards, reduces their travel times, improves the environment, and improves health by reducing tailpipe smoke inhalation.

This system may be implemented initially by using special lanes such as high occupancy lanes, but can be applied to all lanes as more users sign up.

Signing up and communicating with this system can be done using a cellular phone using short message service or an interactive voice response system or any interne data application.

Hence combining a motorist tracking system to check whether the motorist has honored the scheduled travel time with a travel scheduling system, enables a traffic management system that results in lower traffic overloads for any roadway anywhere with minimal investment.

Improving road traffic conditions even by a few percentage points can have dramatic positive effects on the environment and this system of present invention provides a way to improve traffic conditions with minimal investment.

DRAWINGS-FIGURES

Figure 1:
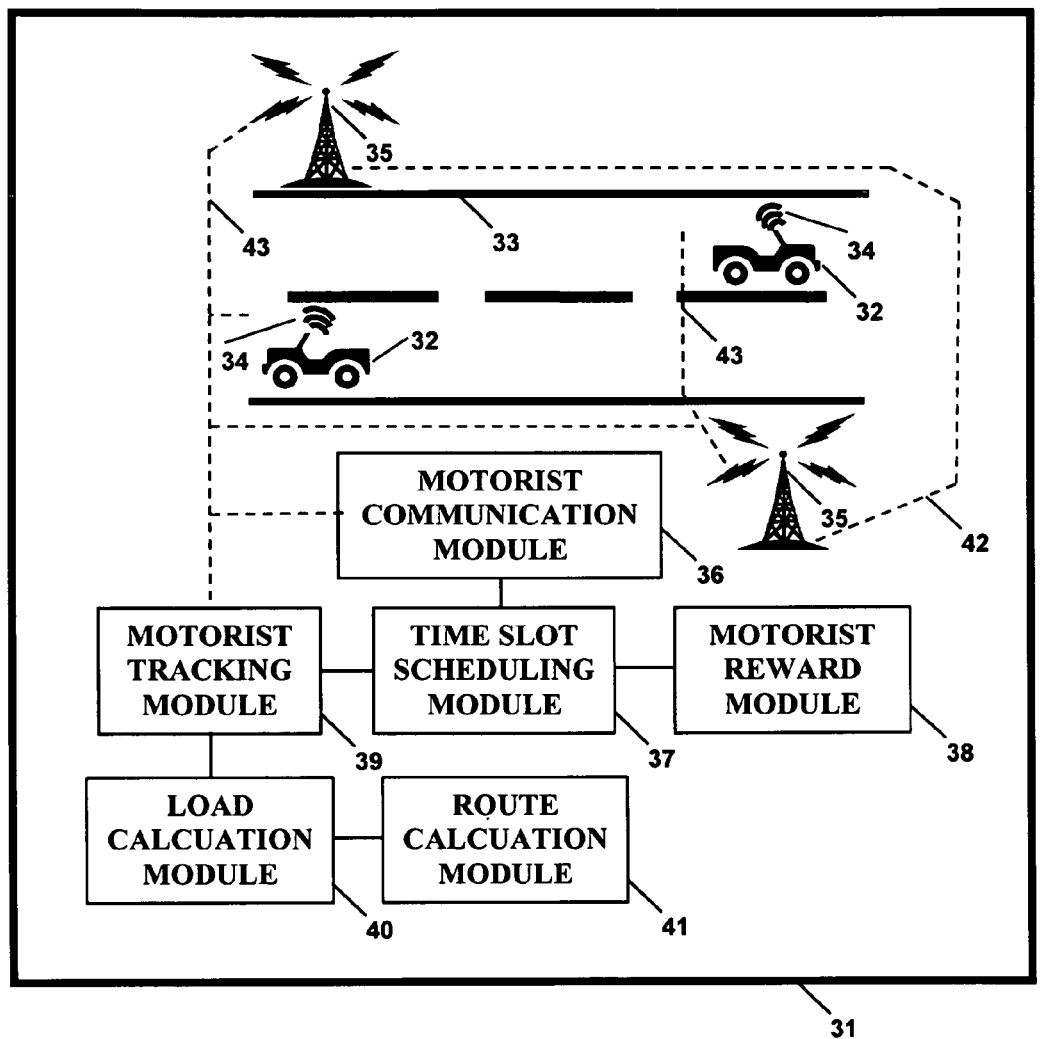
FIG. 1 shows traffic management system of present invention.

DRAWINGS-REFERENCE NUMERALS 31 traffic management system of present invention
32 motorist
33 roadway
34 a cellular mobile device associated with a motorist
35 cellular base station for a motorist to communicate with cellular network
36 motorist communication module
37 time slot scheduling module
38 motorist reward module
39 motorist tracking module
40 load calculation module
41 route calculation module
42 base station network
43 cellular wireless network
44 step
45 step
46 step
47 step
48 step
49 step
50 step
51 step
52 step
53 step

DETAILED DESCRIPTION OF PREFERRED EMBODIMENT

In the following description, traffic management system of present invention is described. Then steps using this system are described FIG. 1 shows traffic management system of present invention 31 that enables a motorist 32 to schedule time slots for travel on a desired roadway 33.

Traffic management system 31 is made up of several functional modules including a cellular mobile device associated with a motorist 34, a cellular base station for a motorist to communicate with cellular network 35, a motorist communication module 36 to enable communication between motorist 32 and a time slot scheduling module 37, a motorist reward module 38, a motorist tracking module 39, a load calculation module 40, and a route calculation module 41. Each of these modules can be a combination of software and hardware systems.

Motorist 32 requests a time slot for travel using communication module 36 that directs the request to time slot scheduling module 37, which then allocates available time slots in the neighborhood of the requested time slot and replies back to motorist of all possible time slots available in the neighborhood time. Motorist 32 can then accept one of the time slots as a time slot for intended travel and confirm the acceptance with time slot scheduling module 37. Once the motorist is scheduled, tracking module 39 starts tracking cellular device 34 of motorist 32 to determine if motorist 32 is indeed traveling in one of the allocated time slots. If motorist 32 does travel during the scheduled time slot, then a reward is given to motorist 32 using motorist reward module 38.

Tracking module 39 is coupled to time slot scheduling module 37. Tracking module 39 is also coupled to load calculation module 40 so that traffic load can be determined by tracking all the motorists that have signed onto this system. Motorists that are not signed into this system may also be used for tracking traffic conditions.

If traffic conditions mandate a route change that is different from the request made by motorist 32 then motorist 32 is notified of a list of acceptable time slots along with a list of new routes by route calculation module 41.

Base station 35 is coupled to other base stations using base station network 42 and cellular device 34 is coupled to base station using cellular wireless network 43.

It can be seen that initially not many motorists may want to schedule their travel since there may not be much time savings realized. But once many motorists start scheduling their travel, time savings can exponentially increase.

Figure 2:
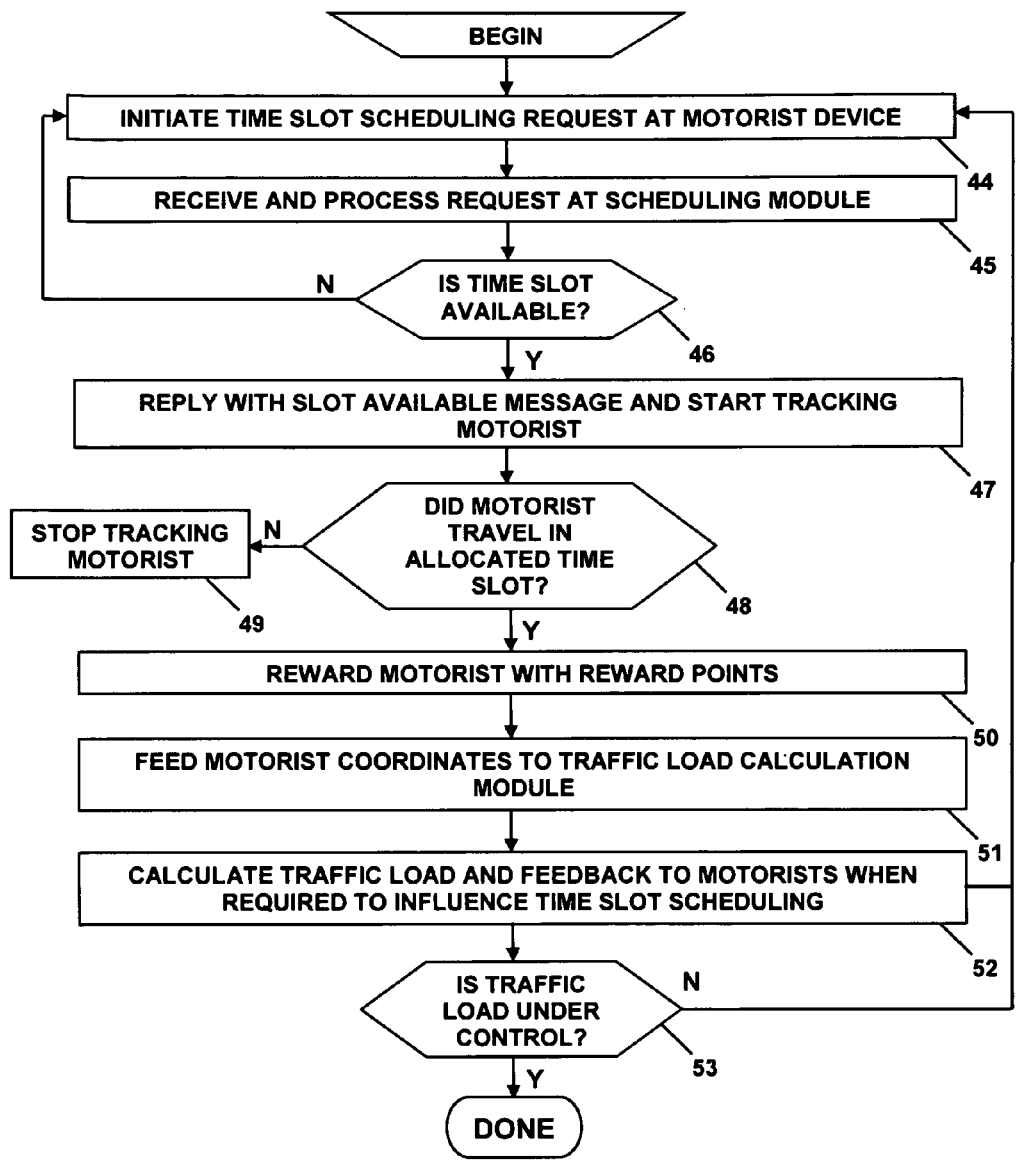
FIG. 2 shows traffic management method of present invention.

FIG. 2 shows a call flow of method to manage traffic in accordance with present invention.

In step 44 a time slot scheduling request is initiated by a motorist 32.

In step 45 this request is received and processed by time slot scheduling module 37.

In step 46 time slot scheduling module 37 checks if requested time slot or any time slots near the requested time slots are available.

In step 47 a reply is sent to motorist 32, indicating that requested time slot or nearby time slots are available and motorist is scheduled on one of the time slots in the reply. Then motorist 32 is tracked to check if the actual travel time is approximately within an acceptable range of scheduled travel time slots.

In step 48 it is determined that a motorist has traveled within acceptable time slot limits or not.

In step 49 motorist 32, is no longer tracked since it was determined that motorist 32 did not travel in the allocated time slot.

In step 50 motorist 32 is rewarded with reward points since the time of travel was within the range of scheduled time slot.

In step 51 coordinates relative to cellular tower positions of motorist 32 are passed to traffic load calculation module 41 to influence the traffic load conditions in this module.

In step 52 a feedback of traffic load conditions is sent to motorists who request a new time slot to influence their choice of desired time slots.

In step 53 it is determined if traffic load is under control and if yes then there is no need to schedule any more motorists. If traffic conditions are still not under control then this process is repeated for more motorists starting at step 44 again.

Reward points may be redeemed in multiple ways including coupons for groceries, air travel points, high occupancy lane travel allowance, and any other offers that promote other businesses. Such a reward system is critical to the initial adoption rate of this system, and once a threshold number of motorists are signed on, everyone will get the benefit of faster travel times in addition to reward points.

This system may be turned on only if a threshold number of motorists sign on, such as five or ten percent of motorists that travel a particular set of freeways.

This system can be implemented in a small area and later expanded nationwide or worldwide.

This system does not adversely affect the travel times of motorists that cannot schedule their travel times in advance, since such motorists can continue to use the roadways on a need by basis. Since the volume of traffic is so high in current roadways, even if a small percentage of motorists sign on, that will decrease the travel times for the entire set of motorists considerably.

The value of such a system is clear as compared with any other system of prior art in terms of return on investment. There is no need to upgrade stop light signals, no need to introduce transducers into automobiles, no need to install cameras to police some motorists and no need to find real estate to install wireless receivers to track motorist movements.

This system can be used with roadways that have freeway entry points and clearly marked lanes or with roadways that are not so organized such as in some underdeveloped nations. If greater than fifty percent motorist signs on to this system in due course, this system can achieve unparalleled results as compared with any solution in prior art.

Advantages

From the description above a number of advantages of this traffic management system become evident:

a) a traffic management system is provided that prevents traffic problems from occurring;
b) a traffic management system is provided that works for roadways that have entry or exit signals, and roadways that do not have them;
c) a traffic management system is provided that does not need large capital investments; and
d) a traffic management system is provided that is scalable.

CONCLUSION, RAMIFICATIONS AND SCOPE

Accordingly, the reader will see that combining a motorist tracking system with a scheduling system and a reward system, enables scheduling of motorists in different time slots so that overall traffic overload can be significantly reduced and speed of travel can be considerably increased, hence providing several advantages including better productivity, environment friendliness, better gas mileage, and better health of motorists with minimal cost of implementation as compared with other solutions in prior art.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

We claim:

1. A roadway traffic management system comprising:
a time slot scheduling module wherein said time slot scheduling module enables scheduling a travel time slot for said motorist in a desired roadway;
a motorist tracking module wherein said motorist tracking module enables tracking of said motorist to check if said motorist is traveling in said roadway in said time slot;
a motorist communication module that enables said motorist to communicate with said time slot scheduling module, to send and receive time slot scheduling messages, and other broadcast informational messages;
a traffic load calculation module to calculate traffic load at a given point in time of any desired roadway that implements said traffic management system, wherein input to said traffic load calculation module is derived from said motorist tracking module;
and a route calculation module to calculate travel routes in said time slots for said motorists based on data from said traffic load calculation module; and
a motorist reward module wherein said motorist reward module rewards said motorist for traveling in said time slot.

2. The roadway traffic management system of claim 1, wherein said communication module supports communication standards selected from group consisting of simple messaging service based communication standard, interactive voice response based standard, and internet data based communication standard.

3. The roadway traffic management system of claim 2, wherein said communication module enables bidirectional communication to send and receive the time slot scheduling messages, and the other broadcast informational messages.

4. The roadway traffic management system of claim 1, wherein said motorist tracking module is implemented using tracking methods that track cellular devices in a cellular network.

5. The roadway traffic management system of claim 4, wherein said motorist tracking module is implemented using tracking methods that track cellular devices in a using cellular network standards selected from group consisting of global system for mobile standard based cellular network, code division multiple access standard based cellular network, and other cellular networks.

6. A method of managing roadway traffic comprising:
scheduling a motorist for a desired time slot to travel on said roadway with a time slot scheduling module;
tracking said motorist traveling in said roadway in a motorist tracking module, to check if said motorist traveled in said scheduled time slot on said roadway;
rewarding said motorist for traveling in said roadway in said scheduled time slot using a motorist reward module;
communicating using a communication module from a device associated with said motorist to said scheduling module to initiate said scheduling of said time slot, and other broadcast informational messages;
calculating traffic load conditions in a traffic load calculation module, wherein input to said traffic load calculation module is derived from said motorist tracking module; and
calculating travel routes for said motorists in a route calculation module to calculate travel routes in said time slots for said motorists based on data from said traffic load calculation module; and
rewarding said motorist for traveling in said roadway in said scheduled time slot using a motorist reward module.

7. The method of managing roadway traffic of claim 6, wherein said communication module supports communication standards selected from group consisting of simple messaging service based communication standard, interactive voice response based standard, and internet data based communication standard.

8. The method of managing roadway traffic of claim 7, wherein said communication module enables bidirectional communication to send and receive the scheduling messages, and the other broadcast informational messages.

9. The method of managing roadway traffic of claim 6, wherein said motorist tracking module is implemented using tracking methods that track cellular devices in a cellular network.

10. The method of managing roadway traffic of claim 9, wherein said motorist tracking module is implemented using tracking methods that track cellular devices in using cellular network standard selected from group consisting of global system for mobile standard based cellular network, code division multiple access standard based cellular network, and other cellular networks.

* * * * *